Figure 1:
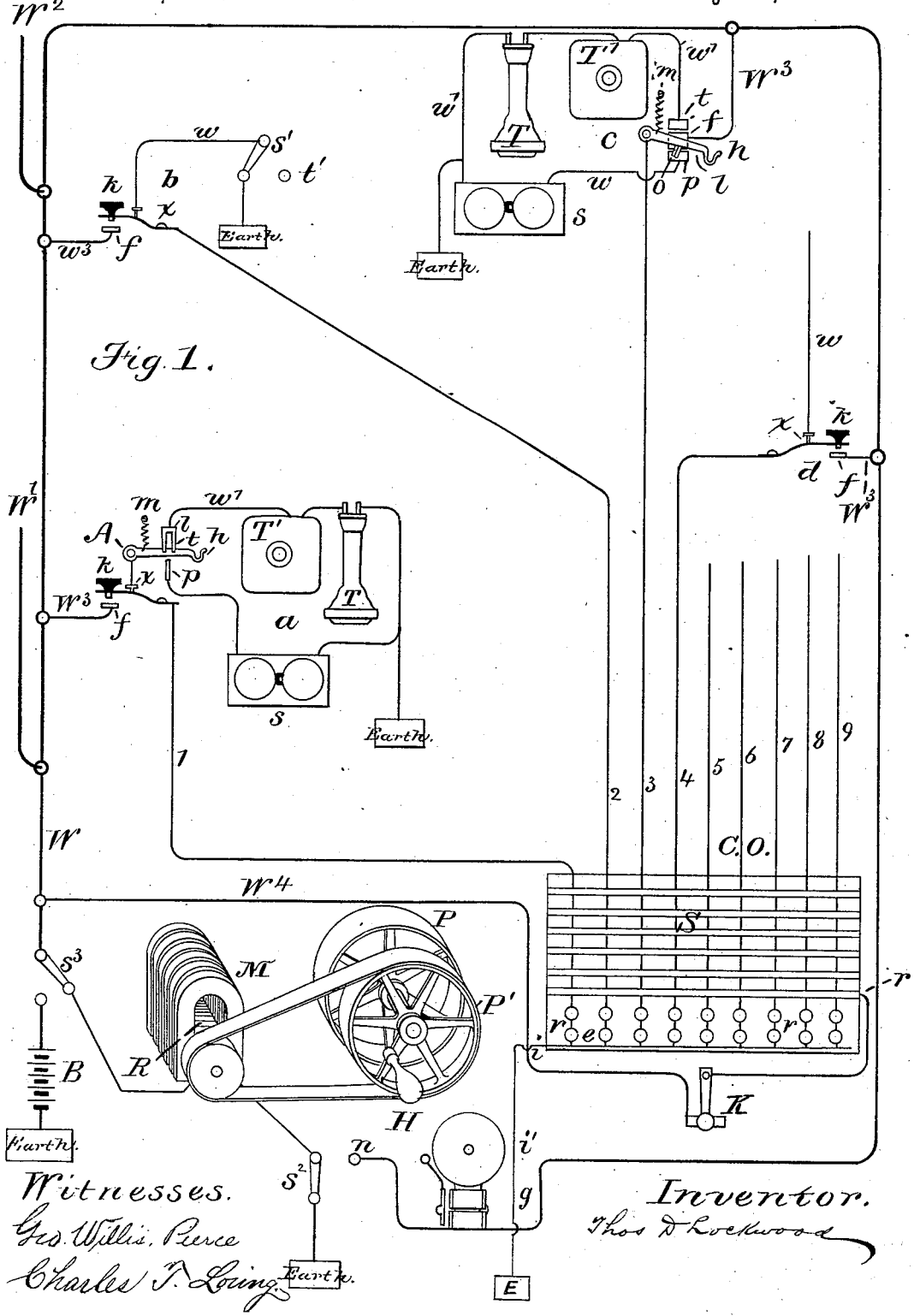

(No Model.) 2 Sheets—Sheet 2.

T. D. LOCKWOOD.
ELECTRICAL SIGNALING APPARATUS FOR TELEPHONE LINES.

No. 260,884. Patented July 11, 1882.

Witnesses.
Geo. Willis Pierce
Charles T. Loring

Inventor.
Thos. D. Lockwood

N. PETERS, Photo-Lithographer, Washington, D. C.

United States Patent Office.

THOMAS D. LOCKWOOD, OF MALDEN, MASSACHUSETTS.

ELECTRICAL SIGNALING APPARATUS FOR TELEPHONE-LINES.

SPECIFICATION forming part of Letters Patent No. 260,884, dated July 11, 1882.

Application filed January 6, 1882. (No model.)

*To all whom it may concern:*

Be it known that I, THOMAS D. LOCKWOOD, of Malden, in the county of Middlesex and State of Massachusetts, have invented certain Improvements in Electrical Signaling for Telephone-Lines, of which the following is a specification.

My invention relates to telephone-exchange systems, and particularly to those features and instrumentalities comprised in such systems by which signaling between the several substations and the central station is effected for the purpose of attracting the attention of the different operators.

It will be understood that by a "telephone-exchange system" is meant an organization of wires, apparatus, and stations in which the several substations are connected by line-wires with a central station to which all the line-circuits of a system converge, each substation being furnished with telephones and with apparatus for sending and receiving signals, while the central station, in addition to these devices, is provided with a switch-board or commutator, whereby any two of the respective line-circuits may be connected together for conversation between a substation upon one line and a substation upon the other.

Heretofore exchanges have been constructed in which each line-circuit has been normally connected with a steady voltaic battery always in circuit with the line and charging the same, together with each signal-bell magnet at the substations located thereon. This battery has been placed at the central station, and signals in this case have been exchanged between the central station and the substations simply by breaking and closing the circuit of the battery, and thus causing the electric bells at the substations to ring, the corresponding bell at the central station also ringing in unison therewith. Another exchange system is also extensively used wherein the several substations are each furnished with a polarized bell to receive signals, and with a magneto-electric machine to generate electricity wherewith to signal the central station when necessary, the central station also being provided with one or more magneto-generators, which may be temporarily attached to any line for the purpose of operating the polarized bells located at the substations of such line in a manner well known to those skilled in the art. Both of these systems and others analogous thereto have certain inherent disadvantages which it is my purpose to overcome by my invention, hereinafter set forth. In the first system which I have cited the expense, care, and space required by permanent batteries render their use highly objectionable, while in the second the necessity of providing each substation with a separate and individual generating-engine results in costly apparatus, which, moreover, requires constant supervision in order that it may be maintained in good working order.

To obviate these disadvantages and to produce an economical and desirable system of electric signaling is the object of my invention; and to this end it consists in the following methods, devices, and instrumentalities: first, in the use at each substation, for the purpose of signaling the central station, of electricity developed by a constant source located at any desirable point within the geographical district to be supplied, but preferably at the central station, and conveyed to the substations by suitable conductors; second, in the use for signaling purposes of a dynamo-electric machine suitably connected by trunk and branch lines with each substation in the system; third, in the method of signaling a central station from any substation by connecting the direct line between them to a normally open branch wire charged from a constant source; fourth, in a system of main and branch circuits, whereby the electricity employed by the substations to signal the central station, as also that employed by the central station to signal the substations, is derived from the same source; fifth, in the method of transmitting call-signals from any sub-station to a central station by removing the telephone from its rest, and thus causing the direct circuit and the supply-circuit to come into momentary contact with one another; sixth, in the instrumentalities, circuit arrangement, and combinations in which the several features of my invention are embodied.

It will be seen by reference to the drawings that in my invention the lines radiating from the central station terminate at each substation in a circuit-changer, which may be constructed to be operated manually or automatically, as desired. Normally, with the telephone in its support, the direct line will continue through the circuit-changer to a signaling-bell, and thence to earth. Upon operating the circuit-changer, however, either manually or by removing the telephone, the direct line between the central and substation is placed in contact with a branch line connected permanently with a magneto or dynamo electric machine, or a battery, also placed at the central station, and a portion of the current produced by such machine will be directed over the direct substation line through the annunciator at the central station, vitalizing it and giving the signal. The telephone-switch, after thus sending the signal, will pass on by means of its retracting-spring and leave the direct line in contact with the telephone branch at the substation, when conversation can be maintained.

Figure 2:
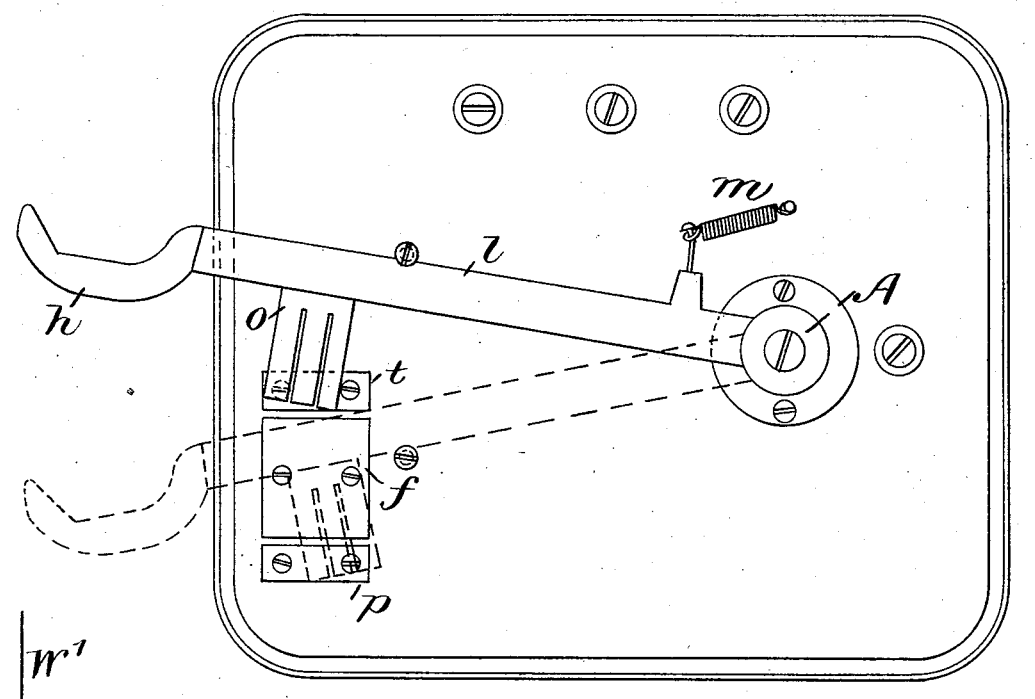
Figure 3:
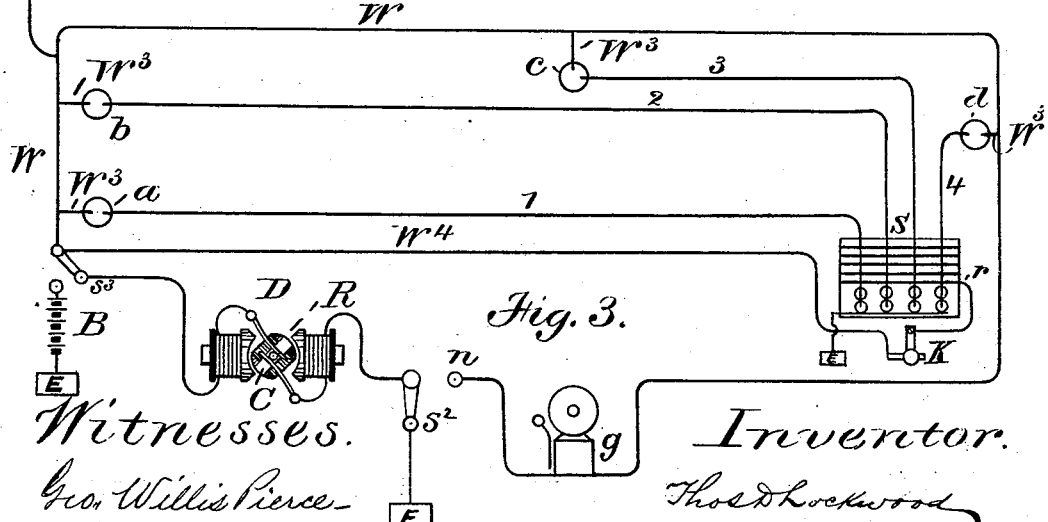

In the drawings by which my invention is illustrated, Figure 1 is a diagrammatic representation of an exchange system constructed in accordance with the terms of my invention, and showing a special conductor connected at one end with a powerful source of electricity, but normally open at the other end, and provided with a series of normally open lateral branches diverging into each substation. Fig. 2 is a drawing of the automatic switch which I prefer to use. Fig. 3 is a similar system to that shown in Fig. 1, but illustrating the use of a dynamo-electric machine.

In Fig. 1 is represented a central telephone-office, C O, from whence line-wires 1 2 3 4 5 6 7 8 9 radiate to the several substations $a\ b\ c\ d$. The line-wires entering the central stations are led to a switch-board, S, and thence each to its respective annunciator $v$, and through the annunciator-coils to a common ground-plate, $i$, and wire $i'$ to earth. At the central station C O, I also provide a magneto-electric machine, M, which is arranged with belt and pulley P', to be driven ordinarily by power, and which is sufficiently large to furnish a current of great strength. One of the wires leaving the armature-coil R of the magneto-machine M is connected by a small switch, $s^2$, to a ground-wire, and thus terminates at earth. The other wire connects by means of a switch, $s^3$, with a conducting-wire, W, preferably of large cross-section, for the proper conveyance of strong electrical currents. This wire W is extended at great length throughout the district served by the exchange, and by means of normally open branch wires $W^3$ enters each substation, terminating therein in suitable terminal plates or anvils, $f$. After completing the circuit of the district the main wire W may, if desired, be brought back to the central station by another route, and thus may be readily tested for continuity, insulation, &c.

In the drawings I have shown it as returning to the central station, where it is connected with the electro-magnet of a small electric bell, $g$, the other terminal of the bell-helix being led to the stud $n$.

When it is desired to test the wire the switch $s^2$, ordinarily connecting the armature of the machine to earth, will be placed on the stud $n$, and the circuit of the wire will, if in good order, pass through the bell-coil, causing the bell $g$ to ring.

The main supply-wire W may, if found desirable, be subdivided into other supply-wires, $W'$ and $W^2$, which in turn may by open branch wires enter the substations for the purpose hereinafter set forth.

Fixed upon the working-shaft of the pulley P' is a second pulley, P, to which the power is communicated from the motor by a belt. Attached to the pulley P' is a crank-handle, H, by which, during temporary cessations of the power, the armature may be manually rotated.

I have also shown a battery, B, as an alternate source of electricity, which may be used at pleasure, and which, when power is unprocurable—as, for example, during the night—may be profitably substituted for the machine by turning the switch $s^3$. A wire, $W^4$, diverges from the main wire W at a point immediately exterior to the switch $s^3$, and is led to the switch-board S, where, by means of the key K and the horizontal bar $r$, or other well-known devices, it may be connected with the central-station end of any of the substation-lines, and the current which it derives from the machine or battery directed onto such line, thus completing a circuit from the machine through the said line and bell $s$, connected therewith at the substation, to earth, ringing the bell $s$ and giving the signal to the subscriber at the substation.

My invention is utilized at the substations in the drawings in different ways, either of which may be employed. At substation $a$ the branch wire $W^3$ from the supply-wire W terminates in a key-anvil, $f$. The direct wire I, terminating at that station, is permanently fixed to a strap-key, $k$, which normally presses by its own resilience against its back contact or limit $x$. This stop $x$ connects by wire with the automatic switch $l$, which at one end, A, is pivoted and at the other is made into a hook, $h$, which is designed as a rest for the telephone T. When the said telephone T is on the hook the course of the circuit is from the switch-lever $l$, through the bell $s$, to earth. When the telephone is removed the lever is drawn upward by the retractile spring $m$, and the course of the circuit is from the switch-lever $l$, by the forked spring $t$, wire $w'$, to transmitter T' and telephone T to earth.

At station $b$, I have only shown a circuit breaking and closing key, $k$, which, normally pressing its back contact, and thus maintaining the circuit through the said contact-point $x$, wire $w$, and switch $s'$ to earth, may be pressed upon the terminal $f$ of the branch wire $w^3$ when necessary. To change the circuit to the telephones, I arrange the switch $s'$ and the stud $t'$, onto which the said switch may be turned. The telephones are in this case to be connected with the stud $t'$, although not shown.

At station $c$ the circuit-changer is incorporated with the automatic telephone-switch. The direct line 3 from the central station is electrically connected with the switch-lever $l$, which, by its hook $h$, serves as a support for the telephone. The lever is provided with a trailing spring, $o$, as more clearly shown in Fig. 2, and when the telephone is in its rest the trailing spring $o$ is in contact with the lower plate, $p$, of a series of contact-plates, $p\ f\ t$, which are the mechanical equivalents of the similarly-lettered plates and springs shown at station $a$.

Since the line-wire 3 is permanently attached to the switch-lever $l$, and the said lever, through the trailing spring $o$, is in electrical contact with the plate $p$, it is obvious that the line 3 is normally continued through the bell $s$ to ground, and that any signals sent by the central station must pass through the said bell, thus causing it to give the alarm. When the telephone is removed from its support the lever is drawn upward by the spiral spring $m$, and the trailing spring $o$ is drawn also upward until it rests upon the uppermost contact-plate, $t$, thus having transferred the terminal of the direct line from the bell branch to another branch including the telephones, the course of the circuit now being from the switch-lever $l$ and trailing spring $o$ to contact-plate $t$, wire $w'$, transmitter T', telephone T, wire $w'$, to ground. But while the trailing spring traveled from $p$ to $t$ it necessarily passed over the middle plate, $f$, which is practically the terminal of the open branch wire $W^3$ of the supply-wire W. During the moment of passing, therefore, the direct line 3 becomes the continuation of the said branch wire $W^3$, and completes the circuit of the same to earth through the annunciator at the central station.

At station $d$, I have merely shown a circuit-breaking key, $k$, resting on its back contact $x$, connected with wire $w$, and the anvil therefor, $f$, connected with the branch wire $W^3$ and the supply-wire W.

Fig. 3 exemplifies an important modification of my improved system, in which a dynamo-electric machine, D, is made to originate the signaling-currents with which the supply-line W is perpetually charged. The connections in Fig. 3 are precisely similar to those of Fig. 1, except that the substations are merely indicated by circles. Since the supply-wire W and the branches $W^3$ are not normally connected with the direct wires 1 2 3 4, I have indicated that fact also by preserving a certain distance between them in the circles which represent the substations.

In the drawings the dynamo-machine is shown as being provided with a commutator, C, whereby the alternating currents generated in the machine are reduced to a continuous current of one direction, and when the signal-bells $s$ at the substations are ordinary electric bells such would be the construction preferred. The current thus generated can be applied with equal facility by the central station, by means of wire $W^4$ and key K and switch-board S, to signal the substation, or by the several substations, through the main supply-wire W, branches $W^3$, and the circuit-changing key $k$ or automatic switch $l$, in combination with the direct wires 1 2 3 4 to drop the annunciators $v$ and give the signal at the central station. The main battery B also subserves the same purpose, although I prefer to use it but as a relief for the machine.

Many exchange systems are fitted at the substations with polarized bells, and under such conditions it would become necessary to interpose an automatic pole-changer or reversing-key between the machine and battery and the main supply-wires W and $W^3$, so that the polarized bells $s$, which respond only to reversals of direction, could be properly rung; or, if preferred, the dynamo-machine may be of such a construction as to furnish alternating currents—as, for example, the well-known "Ladd" dynamo-machine—in which case the reversing apparatus would no longer be necessary.

My object in employing the dynamo-electric machine D in preference to the magneto-machine M is for the production of currents of greater volume and lower intensity than it is possible to obtain from a magneto-machine. By obtaining the greater volume I acquire a greater facility of division of the current, so that many substations may use the current simultaneously without causing a perceptible diminution in the magnetic strength thereof, and by reducing the intensity I correspondingly reduce the proportion of escape at the supports of the conveying-wire. In large exchanges, therefore, the dynamo-machine is to be preferred, since the current it produces may be readily split; but for exchanges comprising only a moderate number of substations the magneto-machine is suitable, and, on account of its cheapness, will often be used, and it may be constructed either with electro or permanent magnets. The currents generated by it will, without the intermediation of a commutator, operate polarized bells; but a pole-changer becomes necessary when the battery B is substituted.

In the operation of the system of signaling herein described the armature R of the machine M is rapidly rotated by power, and strong electric currents are generated within its coils whenever the circuit including the said armature-coil is closed. This circuit being already closed at one terminal through the switch $s^2$ to earth, the wire W and all the branches thereof, constituting a continuation of the armature-coil in the other direction, may be considered as heavily charged with electricity. Now, as one of the branches $W^3$ enters each substation to signal the central station, it is only necessary to press the key $k$, as in station $a$, or to remove the telephone, as in station $c$, when the direct substation-wire is thus transferred from its normal terminal branch circuit through the signaling-bell $s$ to the open branch $W^3$ of the supply-wire W. The electricity, which has hitherto been quiescent in the wire W and its branches, becomes active, and is directed by the union or contact of the branch wire $W^3$ with the key $k$ or spring $o$, which form part of direct wire 1, 2, or 3, as the case may be, through the said direct wire, continuing through its respective annunciator-magnet $v$ to earth at the central station. Thus the circuit of the machine is momentarily completed, and by the fall of the annunciator-shutter under the influence of the current the signal is given. Conversely, when the central station signals the substation the desired line-wire 1, 2, or 3 is placed in connection with the cross rod $r$ of the switch-board S and the key K pressed by the operator. In this case the machine-circuit is completed through the wire $W^4$, key K, rod $r$, switch-board S, line-wire 3, for example, switch lever $l$, plate $p$, office-wire $w$, signal-bell $s$, to earth, and the current passing through the said signal-bell causes it to ring.

It is obvious, then, that by the use of my invention I am enabled to dispense with the usual generating-engine at each substation, and that, furthermore, I am enabled to signal the central station by the mere act of removing the telephone from its support.

It will also be observed that when, in the case presented by substation $c$, the telephone is restored to its rest another signal is transmitted to the central station, and the central station may therefore be notified that the conversation is concluded.

I am aware that prior to my invention a second wire has been used in signaling; but my invention is essentially different in operation and object, it esssence being in the conveyance of electricity for signaling purposes from its source at the central station to any or all of the substations, and in suitable appliances whereby the electricity so furnished at the substations can be conveniently applied to the direct-line wires, and to accomplish these ends the supply-wire I use is actually brought into contact with and forms part of the direct wires during the moment of signaling.

Although I have described exchanges in which but one substation is placed on a line, it is obvious that any number may be placed on a single line by a slight alteration of the connections of the circuit-changer at each substation.

I claim as my invention—

1. The combination, with the series of subscribing-lines, of a signaling-circuit with normally open branches entering the substations, a source of electricity, such as a battery, a dynamo or a magneto electric machine in said circuit and switches, or circuit-changers at said substations for connecting the subscribers' lines with said branches, so that the subscriber signals over his own line, substantially as described.

2. The combination of the subscribers' lines, the signaling-circuit, with normally open branches entering the substations, the source of electricity, such as a battery, a dynamo or a magneto electric machine, an automatic or gravity telephone-switch at each substation, and contacts and connections, whereby the mere act of removing the telephone at any substation from its support establishes an electric connection at that station between the subscriber's direct line and the branch of the signaling-circuit and causes the signaling-current to traverse the said direct line, substantially as described.

3. The combination, with a switch permanently connected to line, of three contact pieces or points for said switch, connected one through a signal-bell to ground, another with a normally charged circuit, and the third to ground through a telephone, substantially as described.

4. In a telephone-exchange system, the combination of a series of subscribers' direct lines, each at its outer terminal normally connected through a signal-bell to ground, a dynamo-electric machine or other source of electricity, a supply-wire constantly charged with electricity from said source, common to a number of substations, and provided with an open branch extending to each substation of the series, and a key or switch at each station, adapted, when operated either manually or automatically by the removal of the telephone from its support, to transfer the private-line circuit from its normal ground-connection to the branch of the charged wire, substantially as described.

5. The combination, in the system of electrical signaling hereinbefore described, of a constant source of electricity having one terminal normally grounded, the said source being common alike to the central station and to each substation, normally open main and branch wires extending from the said source of electricity to each substation and to the signaling-key or circuit-closer at the central station, and means, as indicated, for transferring the current from the open branch wires to either end of the subscribers' lines, substantially as and for the purpose described.

6. The combination, in a telephone-exchange system, with a series of subscribers' lines, of a separate signaling-circuit, a continuous-current dynamo or magneto electric machine in a branch of said circuit, a battery in another branch, and a switch for connecting at will in said circuit said electric machine or said battery, substantially as described.

7. In a telephone-exchange system, a continuously-operating dynamo or magneto electric machine or equivalent source of electricity, located at any suitable point, and adapted, by means of main and branch conducting-wires, to supply all the necessary currents for signaling purposes to the central station and to each substation connected with the said exchange system, as described.

8. The combination, in an electrical system, with a series of lines, of a branch containing a dynamo-electric machine having its field excited in said branch, and switches or connectors for joining said branch to said lines individually for the purpose of signaling, substantially as described.

9. The combination of a series of subscribers' lines, signaling devices in the several lines at the central office, a distinct signaling circuit or circuits, a battery or other generator of electricity—such as a dynamo or magneto electric machine—electrically connected with said signaling circuit or circuits, and also with the central-office terminals of the subscribers' lines, and switches or circuit-changers at the substations for altering thereat the circuit-connections of the aforesaid generator, so as to operate for each station the signal device in the line whereon said station is placed, substantially as described.

10. The combination of the subscribers' lines, the signaling devices or call-bells at the substations, the signaling devices or annunciators at the central office, one or more generators of electricity, a signaling circuit or circuits, switches or circuit-changers at the substations for altering the circuit-connections of a generator, so as to operate for each station the signal device or annunciator in its own line at the central office, and switches or circuit-changers at the central office for altering the circuit-connections of a generator, so as to operate the signal devices or call-bells at the substations, the generator-circuit, as well in the case of a subscriber calling the central office as of the latter calling the former, being composed in part of the signaling-circuit and in part of the direct line of the subscriber calling or called, substantially as described.

11. The combination, with the movable telephone support and switch, the spring for shifting the same when the telephone is removed, and a line-wire or conductor connected with said switch, of the contact-piece connected with the signal or call bell, the contact-piece connected with the telephone, and the intermediate contact-piece connected with a generator of electricity or means for operating a signal device, said switch being adapted to make contact with all said pieces, substantially as described, so that when the telephone is on the support the call-bell is connected in with the line-wire or conductor aforesaid, and when the telephone is removed the switch is shifted, cutting out the call-bell and connecting in the telephones, and in its movement temporarily connecting in the generator or signaling means, as set forth.

In testimony whereof I have signed my name to this specification, in the presence of two subscribing witnesses, this 3d day of January, 1882.

THOS. D. LOCKWOOD.

Witnesses:
GEO. WILLIS PIERCE,
CHARLES T. LORING.